United States Patent

Reeves et al.

[15] 3,684,937
[45] Aug. 15, 1972

[54] REVERSIBLE D. C. MOTOR SYSTEM
[72] Inventors: John R. Reeves, Trafford, Pa.; Joseph E. Oliwa, Woodbridge, Conn.
[73] Assignee: Westinghouse Electric Corporation, Pittsburgh, Pa.
[22] Filed: Feb. 11, 1971
[21] Appl. No.: 114,630

[52] U.S. Cl..................................318/261, 318/300
[51] Int. Cl..............................................H02p 3/12
[58] Field of Search......................318/261, 284, 300

[56] References Cited

UNITED STATES PATENTS

| | | | |
|---|---|---|---|
| 3,584,281 | 6/1971 | Reeves et al. | 318/284 X |
| 3,582,740 | 6/1971 | Reinert | 318/284 |
| 3,184,670 | 5/1965 | Reynolds | 318/300 |

*Primary Examiner*—Bernard A. Gilheany
*Assistant Examiner*—W. E. Duncanson, Jr.
*Attorney*—F. H. Henson, R. G. Brodahl and C. J. Paznokas

[57] ABSTRACT

A reversible D.C. motor system is energized from an A.C. source and provided with a reversible field excitation system for controlling the direction of rotation of the motor. The field excitation is provided by a field exciting winding energized by a half-wave rectifier arrangement, the output of which is selectable to energize the field winding by either positive or negative half-wave rectified A.C. with a capacitance connected across the winding to smooth out the half-wave energization and energize the winding from the capacitance when not energized by the rectified half-wave A.C. whereby a continuous current energization is provided to the field winding during normal operation. A threshold voltage breakdown means is connected reverse biased across the field winding and has a voltage breakdown threshold which is a predetermined percent above the normal maximum peak half-wave A.C. supplied by the rectifier, so that on cessation, for any reason, of supply of half-wave rectified, A.C. from the rectifier, such as during a deenergization of the field prior to reversal thereof for reverse motor operation, the magnetic inductively stored energy of the field is rapidly dissipated in the threshold breakdown means during breakdown thereof after the field winding has discharged into the capacitance to the point of having raised its voltage to the threshold value of the breakdown means.

Operation of the motor is controlled manually by switching means having forward and reverse positions, and an intermediate braking position. In the latter position, dynamic braking of the armature is used to expedite its stoppage. Protective interlock circuits prevent energization of the armature when the field winding is deenergized and prevent applying reverse energization to the field winding before the motor has stopped. Other protective circuits prevent restarting of the motor until it is fully stopped and provide rapid deenergization of the armature under predetermined excess armature current conditions and deenergize the entire system should the excess current condition continue beyond a predetermined time.

4 Claims, 2 Drawing Figures

REVERSIBLE D. C. MOTOR SYSTEM

BACKGROUND OF THE INVENTION

1. Field of the Invention

This invention relates to reversible motor systems, and particularly to D.C. shunt motors having reversible field excitation systems for controlling the direction of rotation and dynamic braking for stoppage of the motors and utilizing rectified A.C. as the power source, with half-wave rectified A.C. for energization of the field windings.

2. Prior Art

Reversible D.C. motors generally are reversed by contactors or switches which reverse the armature energization as this has been found the safest procedure in the past. Reversing the field by contactors or switches is generally considered unsafe because the motor may dangerously overspeed if the armature is energized and the field winding is not, and because of the high magnetic inductance in the field system. Solid state reversible field energization has been used in some instances for relatively large machines in which the armature current was limited to prevent overspeeding should the field be deenergized while the armature is energized. When an A.C. source has been used to energize a D.C. motor, the field supply has generally been full-wave rectified A.C., with complicated solid state switching circuits.

SUMMARY OF THE INVENTION

The present invention is directed to an A.C. source energized D.C. motor system which provides for driving, reversing, and braking of the motor, wherein reversing and braking are effected by a selector switch through a fully interlocked electronic system which assures complete stoppage of the motor before restarting in the reverse direction with the current limited to a safe value, all regardless of the speed of operation of the selector switch from forward rotation to braking and stoppage of the motor, to reverse, or vice versa.

An object of the invention is to provide an improved reversible D.C. motor operated from an A.C. source.

Another object of the invention is to provide an improved D.C. field field system energized from half-wave rectified A.C.

A further object of the invention is to provide an improved D.C. filed excitation system energized from half-wave rectified A.C., with means for rapidly dissipating inductively stored field energy on cessation of the rectified half-wave A.C. supply.

Yet another object of this invention is electronically to interlock the armature braking current with the field control to prevent reversal of field winding energization during dynamic braking.

A still further object of this invention is the provision of electronic interlocks to prevent application of energization to the motor when it is not fully stopped.

Further objects and advantages of this invention will become apparent from the following description referring to the accompanying drawings forming part of this specification.

DETAILED DESCRIPTION OF THE INVENTION

Figure 1A:
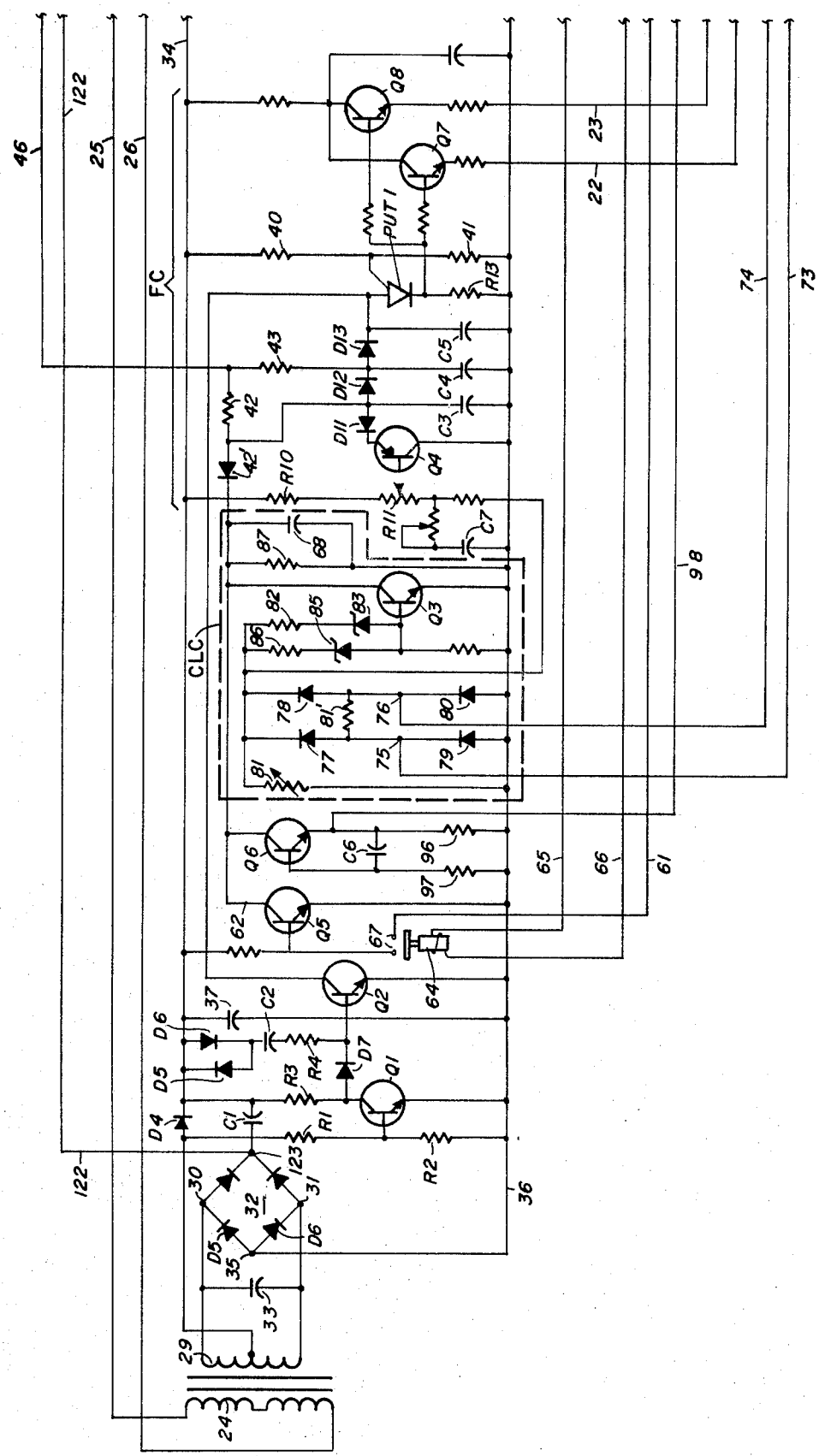
FIG. 1A is a schematic diagram of part of an embodiment of the improved reversible D.C. motor system of the present invention illustrating part of the control circuitry, particularly the armature energization control, with certain lines shown broken and extending to corresponding lines in FIG. 1B.

Referring to the drawings, an embodiment of the improved D.C. motor reversible drive and braking system of this invention, including an improved half-wave rectified A.C. field energization circuitry, is shown for a motor having an armature A and a field exciting winding F. Energization of the system is provided by a suitable A.C. power source S, which may comprise a 60 Hz sinusoidal supply of suitable voltage, such as 220 volts r.m.s., connected to input terminals 10 and 11. The A.C. power to the system is controlled by a suitable conventional thermal-magnetic circuit breaker 12 and fuses 13. When either of these is open the entire system is deenergized. The circuit breaker 12 protects the system if an overload, insufficient to blow fuses 13, exists for a few seconds, such as a current-limited short on the armature leads. The fuses 13 disconnect the system in the event of internal shorts.

Power is supplied to energize the motor armature A by a phase-controlled, current limited, constant preset voltage power supply of the type disclosed in copending patent application Ser. No. 811,743—John R. Reeves et al. Circuitry and operating techniques disclosed in this copending application are incorporated herein and will not be repeated in detail for providing a phase-controlled pedestal and ramp armature power supply. The A.C. power source is connected to input terminals 14 and 15 of a main rectifier bridge array including a pair of diodes D1 and D2 and a pair of controlled switching devices 16 and 17, which may comprise silicon controlled rectifiers or thyristors, arranged in a full-wave rectifier bridge circuit with a positive output terminal 18 and a negative output terminal 19. The bridge output terminal 18 is connected to an armature brush 21 through a positive bus B+, and the output terminal 19 is connected to an armature brush 20 through a negative bus B−. A diode D3 is connected across the bridge output terminals 18–19 in order to assure that the switching devices 16 and 17 are commutated OFF at the ends of the positive and negative half cycles, otherwise the armature inductance would cause current to continue flowing therethrough in the same direction and the phase control of the power would be lost. This is a "free wheeling" diode, which also absorbs inductive kicks from the armature A. With this type of power supply, the motor armature A is provided with pulses unidirectional energization which varies in magnitude and duration according to the phase of each half cycle during which the switching devices 16 and 17 are gated ON by a control system illustrated generally in FIG. 1A and to which the gates of the switching devices 16 and 17 are respectively connected by conductors 22 and 23. The gates of the switching devices 16 and 17 are also respectively connected through resistors 16' and 17' through bridge terminal 18 to their respective device cathodes.

Figure 1B:
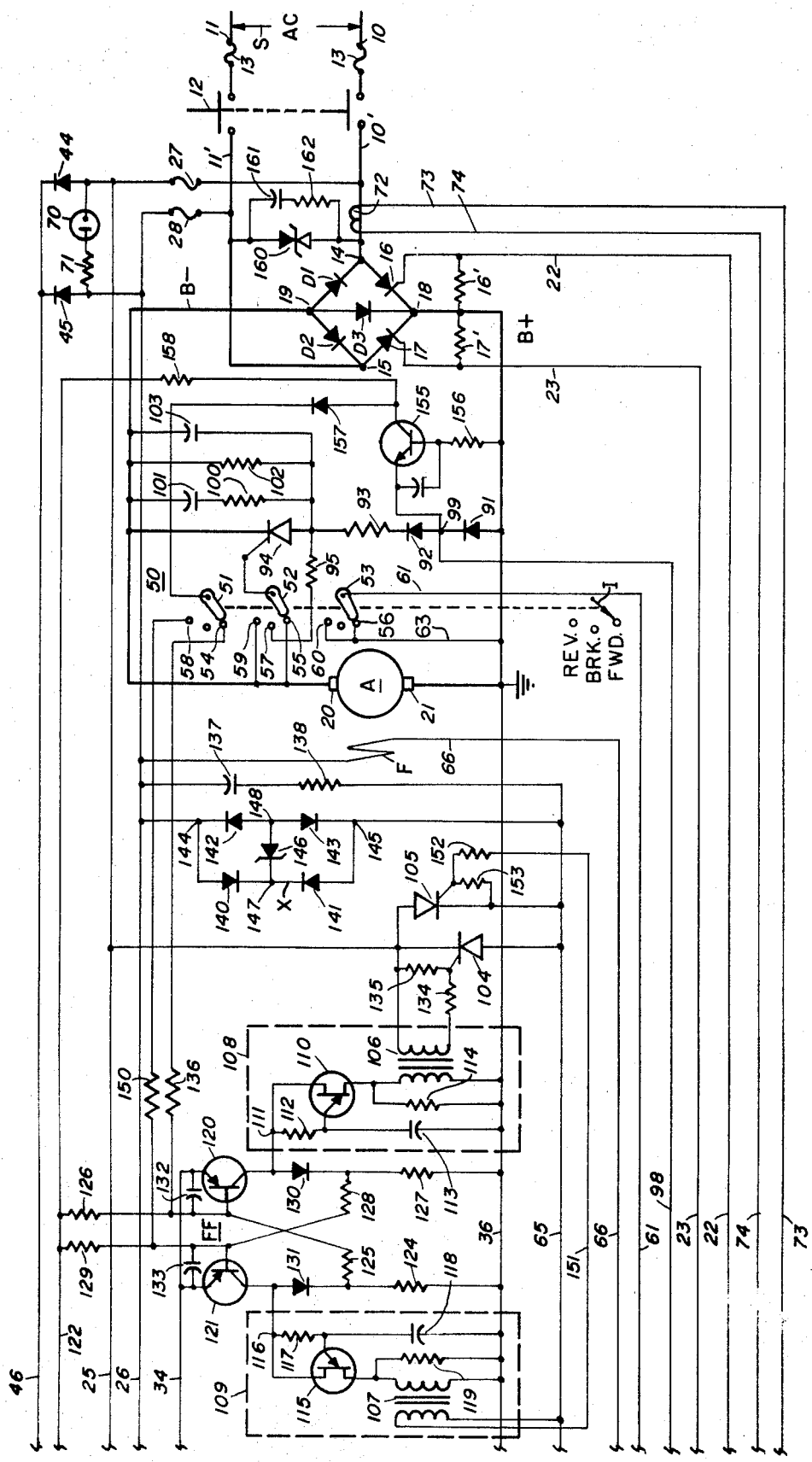
FIG. 1B is a schematic diagram showing the remainder of the reversible D.C. motor system of FIG. 1A, with certain lines extending to corresponding lines in FIG. 1A and designated by the same references in both figures.

The control circuit shown in FIG. 1A is energized by a transformer having a primary winding 24 connected through conductors 25 and 26 and fuses 27 and 28, FIG. 1B, across the main A.C. source lines 10' and 11', respectively. This transformer has a center tapped secondary winding 29 connected across input terminals 30 and 31 of a full-wave rectifier 32 and has a spike suppression capacitor 33 also connected thereacross. The secondary winding 29 center tap is connected through a diode D4 to line 34 with the cathode of the diode D4 establishing the voltage of this line. Rectifier 32 terminal 35 provides the return path to the outer terminals of the secondary winding 29 through rectifier diodes D5 and D6 and the respective terminals 30 and 31 from a common grounded line 36 connected to the main positive bus B+. A filter capacitor 37 is connected between line 34 and grounded line 36.

As previously pointed out, the motor armature is energized when the switching devices D1 and D2 are respectively gated ON. This gating is provided by a firing circuit FC, FIG. 1A, which generates gate applied firing pulses at predetermined desired phase angles of the half cycles of the A.C. power source, according to a "ramp and pedestal" voltage control technique explained in detail in previously mentioned copending application Ser. No. 811,743—Reeves et al. This firing circuit comprises a unijunction, or an integrated circuit, PUT 1, which latter may be a programmed unijunction, such as a General Electric D13T1, which simulates the action of a unijunction except that the intrinsic standoff ratio $\eta$ held to a constant value by resistors 40 and 41. These latter resistors form a voltage divider connected between lines 34 and 36, with a connection therebetween connected to the gate of the programmed unijunction PUT 1. A capacitor C5, connected across unijunction PUT 1, prevents R.F. pickup at the anode of unijunction PUT 1 from triggering the device. The operation of this type firing circuit FC is explained in detail in the previously mentioned copending application Ser. No. 811,743—Reeves et al., including the functioning of the capacitors C3, C4, and C5; the diodes D11, D12 and D13; the transistor Q4 and the voltage divider including the resistors R10 and R11 to provide the desired control of the firing circuit. The resistor 42 and capacitor C3 determine the "-pedestal". voltage component and the resistor 43 and capacitor C4 determine the "ramp" voltage component. When the voltage at the PUT 1 anode exceeds by a predetermined value, such as 0.6 volts, the voltage at the PUT 1 gate (determined by resistors 40 and 41), the PUT 1 breaks down to a low value of resistance across its anode to cathode path. This discharges capacitors C3, C4, and C5 through resistance R13. This is in the form of a pulse which is amplified in a conventional manner by the transistor amplifiers Q7 and Q8 and fed respectively over lines 22 and 23 to the gates of the SCR's 16 and 17 of the main full wave rectifier.

Overall general operation of the motor is controlled by a three-position selector switch 50 having three ganged contactors 51, 52, and 53, concurrently operable to forward (FWD), braking (BRK), or reverse (REV) positions as indicated by the indicator I ganged therewith. FIG. 1B shows the contactors in forward position, with the contactors 51, 52, and 53 respectively in engagement with contacts 54, 55, and 56. The intermediate position is open for the contactors 51 and 53, with the contactor 52 in engagement with a braking control contact 57. The third position closes the contactors 51, 52, and 53 respectively on the reverse rotation contact 58, 59, and 60.

Initially, before the motor is started, it is held at standstill; or if it is running and is to be reversed, it is first brought to a complete stop and then reversed; or if running and it is simply to be stopped, the stoppage and holding at standstill is achieved by complete deenergization of the armature and field winding and full rapid dissipation of the dynamic and magnetic inductive energy stored therein. This stopping and holding at standstill of the motor armature A is achieved by an interlocked deenergization of the armature and dynamic braking thereof, with concurrent deenergization and dissipation of the inductively stored energy of the field winding F. These procedures are effected by placing the selector switch 50 in its braking position. In this position, contactor 53 is in its central position and is open circuited, which assures that line 61 is open, so that the base of transistor Q5 is at substantially line 34 voltage. This allows Q5 to conduct, thereby reducing the voltage on line 62 substantially to ground. This holds the pedestal voltage component at substantially zero, and turns off the unijunction PUT 1 thereby turning off power to the armature A from the A.C. supply through the main rectifier SCR's 16 and 17.

A dynamic braking circuit, comprising series connected diodes 91 and 92 connected in series with an energy dissipating braking resistor 93 and an anode-cathode circuit of a gate controlled switching device 94, such as a silicon controlled rectifier, is connected between the positive bus B+ and negative bus B–, directly across the motor armature brushes 20–21. During motor running conditions, either forward or reverse, the control switch contactor 52, connected to the SCR 94 gate, respectively engages contacts 55 or 59, both connected to the negative bus B–. This places the SCR 94 gate at the same potential as its cathode, thereby assuring turn-off of the SCR 94 and open-circuiting the dynamic braking resistor 93 from the armature A. During braking and holding at standstill of the armature A, the control switch is turned to its mid position. This places its contactor 52 in engagement with contact 57, thereby connecting the SCR 94 gate through resistor 95 to its anode. At this point, since the SCR94 is off, the braking circuit therethrough is nonconductive, whereby the voltage of the SCR 94 anode is substantially at the potential of the positive bus B+. Thus, connection of the gate to the anode of SCR 94 places a biasing voltage on the gate sufficient to turn ON the SCR anode-cathode circuit, thereby connecting the previously given series dynamic braking circuit across the motor armature A, whereby a dynamic braking current flows from the armature A through the energy-dissipating braking resistor 93 during rotation of the armature. This rapidly absorbs the stored kinetic energy of the armature and its driven load, bringing the motor to a stop.

An interlock is provided between the motor armature energization control circuit and the dynamic braking circuit which senses current flow in the braking circuit and opens the armature energizing circuit through the main full-wave rectifier. This interlock includes a transistor Q6 having its collector-emitter circuit connected between lines 62 and 36 in series with resistor 96 and its base connected through a resistor 97 to line 36. A line 98 connects transistor Q6 emitter to the connection point 99 between diodes 91 and 92, and the forward voltage drop across diode 91, due to braking current therethrough, turns ON the transistor Q6. This discharges capacitor 68 and keeps it discharged as long as braking current flows through diode 91, thus preventing the supply of gating pulses to the gates of the main rectifier SCR's 16 and 17, thereby keeping them turned OFF and effectively preventing the supply of energization to the armature A until the motor has stopped.

As explained in the previously mentioned copending application Ser. No. 811,743—Reeves et al., the setting of the variable resistor 82 determines the steady state operating speed of the motor; however, at low speed settings, "cogging" may result unless capacitors C3, C4, and C5 are completely discharged at the end of each half cycle. The control resistors R1, R2, and R3 control operation of transistor Q1, which controls operation of transistors Q2 to assure the complete discharge of capacitors C3, C4, and C5 at the end of each half cycle to effectively prevent low speed "cogging." The second series-connected diode 92 in the dynamic braking circuit prevents reverse voltages from being impressed across the transistor Q6 base-emitter junction. Various additional protection features are provided for the SCR 94. One such is a series circuit of a resistance 100 and a capacitance 101 connected across the anode-cathode circuit of the SCR 94 to protect it from fast time-rise voltages generated by the SCR's 16 and 17 of the main rectifier. Rise times in the order of 1,000 volts per microsecond have been observed. By placing the RC network 100–101 after the diodes 91 and 92, the capacitance 101 charges to a value in excess of the peak supply voltage, thereby effectively backing off the fast rise supply voltage. A resistance 102 is connected across the 100–101 RC network and prevents capacitor 101 from charging to too great a value from armature A spikes. A capacitor 103 is also connected in parallel across the 100–101 RO network and protects the rectifier SCR's 16 and 17 from very fast short voltage spikes generated by the armature A under heavy load or start-up conditions.

Further armature control circuit protection is provided to assure against possible contingent undesirable and damaging transient conditions. When the A.C. supply is switched ON, a voltage appears immediately on line 46, charging capacitors C3, C4, and C5 to a low value. Since capacitor 37 limits the rate of rise of the supply for the first few half cycles, the voltage at the gate of the unijunction PUT 1 is at a low value also, so that during the first six or seven half cycles the unijunction PUT 1 may fire, tending to cause the motor to kick slightly, even with the switch 50 at brake.

A resistor R4 in series with a capacitor C3 and diodes D6 and D5 inject a small current, during switch-on into the base of transistor Q2 causing it to conduct and thereby hold the voltage across capacitor 37 at zero, thus preventing a starting kick. The diode D5 discharges the capacitor C1 at switch-off. The diode D6 prevents positive feedback from the motor to the line and the instability which would result; e.g., if the supply rises, the series resistor R4–capacitor C3 circuit would conduct, causing transistor Q2 to short out capacitors C3, C4, and C5, thus reducing the current to the motor. As the current to the motor is reduced, the supply voltage rises; transistor Q2 is forced into conduction, causing further reduction of the motor current, in a cumulative manner. The diode D6 ensures that fractional changes in line voltage (after the first change) have no effect on the system, since diode D6 becomes reverse biased, thus preventing flow of current through resistor R4 and capacitor C3 under such conditions. A diode D7 prevents the transistor Q1 shorting to ground the current through the resistor R4 and capacitor C3 at switch-on while transistor Q1 is conductive.

In order to operate the motor, the switch 50 is turned on either of its end positions. For forward drive, switch 50 is turned to the position shown in FIG. 1B, in which contactor 51 engages contact 54, contactor 52 engages contact 55, and contactor 53 engages contact 56. For reverse drive, contactor 51 engages contact 58, contactor 52 engages contact 59, and contactor 53 engages contact 60. Thus for forward or reverse drive, contactor 51 is in engagement respectively with contactor 54 or 58, and the field winding F is energized by SCR 104 or 015, respectively, as will be explained later. This energization of the winding F is from the A.C. source line 10' to line 25, through either SCR 104 or 105, line 65, through relay coil 64, to line 66, field winding F, to line 26, and source line 11'. This also energizes the relay coil 64, which activates the relay and closes a circuit through relay contacts 67. This grounds the base of transistor Q5 through relay contacts 67, line 61, selector switch contactor 53, either contact 56 or 60, line 63 to ground through the positive bus B+. This turns off the transistor Q5 and thereby allows capacitor 68 to charge up through diode 69, resistance 42, and line 46 through diodes 44 and 45. The glow tube 70 is connected across lines 25–26 through resistance 71 to indicate when these lines are energized. Charging of capacitor 68 raises the pedestal voltage component in the firing circuit FC, and, after several half cycles it will have risen sufficiently to cause the ramp voltage to exceed the unijunction PUT 1 triggering voltage. This causes SCR 16 or 17 of the main rectifier to fire at the end of the half cycle, giving a small motor armature current. The voltage across capacitor 68 continues rising; causing an increase in the armature current.

The armature energization control also includes a current limiting circuit CLC. Current limiting in provided by holding the "pedestal" voltage component at a value lower than that determined by the speed setting.

A current transformer 72 senses the armature current through conductor 10' and transmits a proportional voltage over leads 73–74 to input terminals 75–76 of a rectifier comprising diode 77, 78, 79, and 80. This produces a voltage across a resistor 81, connected across the rectifier, which is proportional to the main line 10' current. This latter voltage is applied to the base of transistor Q3 through a resistor 82 and reverse biases Zener diode 83. The resistance of resistor 81 is adjusted so that the voltage across it exceeds the Zener voltage of diode 83 when the main line 10' current reaches a predetermined value. When this occurs, current flows into the base of transistor Q3 which turns on transistor Q3. This partially discharges capacitor 68, and thus reduces the pedestal voltage component which causes a reduction of the motor armature current on the following half cycle. The motor armature current then remains at this adjusted value until the motor reaches the set speed, after which it ceases affecting its control. Should a sudden dangerously large increase occur in line 10' current, the resultant high voltage from current transformer 72 rectified and applied across resistor 81 will cause Zener diode 85 to reach its Zener voltage, which is chosen suitably higher than that of diode 83, so that it will conduct current therethrough in series with resistance 86 which is relatively low compared to resistance 82. This results in a relatively large base current into transistor Q3 which assures the discharge of capacitor 68. This limits the main line 10' current to a predetermined value within one cycle of the A.C. supply. If the overload continues for several seconds, the main thermal circuit breaker 12 will trip. Resistor 87 is connected across capacitor 68 to assure that it discharges when the motor is turned off.

During braking and when the motor is stopped, its field winding F also must be deenergized, and inductive energy, which is stored in the field during its energization, must be dissipated. This is essential when the motor is being shut down, as well as when it is being stopped before being reversed. According to the present invention, the motor armature current is not reversed for reverse operation. Reversal is obtained by reversing the motor field excitation, during which it is deenergized and its inductively stored energy is completely dissipated before reverse energization is begun. This is effected by the use of relatively simple circuitry interlocked with the armature energization and braking control and also controlled by the three-position, three-contactor switch 50.

Energization has provided the field winding F by half-wave rectified A.C. and a capacitance connected in parallel with the field winding. The half-wave rectified A.C. is supplied by silicon controlled rectifiers 104 and 105, which are operable to supply opposite polarity half cycles of A.C. for respectively opposite directions of rotation of the motor, the SCR 104 provide positive half-wave rectified A.C. and the SR 105 provide negative half-wave rectified A.C. These SCR's 104 and 105 are selectively fired by firing pulses supplied to the gates thereof by transformers 106 and 107, respectively. These transformers 106 and 107 are energized by suitable conventional pulse generators 108 and 109, respectively, of which each transformer may be considered a part. Pulse generator 108 comprises a unijunction transistor 110, one base of which is connected to the primary of transformer 106 and the other base of which is connected to an input terminal 111. The UJT 110 emitter is connected to the input terminal 111 through a current limiting resistor 112 and to the common ground line 36 through a capacitor 113. A resistor 114 is connected across the primary of transformer 106 to provide an energy dissipating path thereacross after the energizing pulse from the UJT 110 has passed. This is a simple conventional relaxation oscillator to which the transformer 196 has been added. The pulse generator 109 comprises a unijunction transistor 115, an input terminal 116, a current limiting resistor 117, a capacitor 118, and a resistor 119 connected across the primary of transformer 107, all similarly arranged and connected as corresponding parts of pulse generator 108.

Energization of the pulse generators 108 and 109 is provide respectively by transistors 120 and 121 of a conventional bistable circuit FF connected by lines 36 and 122 across output terminals 35 and 123, respectively, of full-wave rectifier 32, energized by the transformer secondary winding 29. The bistable circuit FF comprises the transistors 120 and 121 connected between the transformer secondary 29 midtap, by line 34 and diode D4, and rectifier 32 output terminal 35, resistors 124, 125, and 126 in series between lines 36 and 122 and resistors 127, 128, and 129 also in another series circuit between lines 36 and 122, diodes 130 and 131 respectively connected between the collectors of transistors 120 and 121 and the connections of resistors 127 and 128 and resistors 124 and 125, and capacitors 132 and 133 connected between the emitter and base of transistors 120 and 121, respectively. When transistor 120 is ON, it supplies power to resistor 127 and to pulse generator 108; and when transistor 121 is ON, it energizes resistor 124 and pulse generator 109. In each instance, when one transistor is ON and one pulse generator is energized, the other transistor of the bistable circuit is OFF and its respectively energizable pulse generator is switched OFF. Pulses from pulse generator 108 transformer 106 secondary are applied to the gate of SCR 104 connected to a tap on a voltage divider comprising resistors 134 and 135 connected across the transformer 106 secondary. The resistor 135 also is connected between the SCR 104 gate and cathode.

The bistable circuit of the transistors 120 and 121 is controlled by the application of a signal voltage to the base of the transistor to be turned OFF and removing the signal voltage from the base of the transistor to be turned ON. In one stable state of the flip-flop FF, transistor 120 is OFF thereby holding transistor 121 ON until a turn-off signal is applied to the base of transistor 121. Transistor 120 turns ON in response to turn-off of transistor 121. This is the other stable state of the flip-flop FF, in which transistor 120 is held ON by the OFF state of transistor 121 until a turn-off signal is applied to the base of transistor 120. In response to turn-off of transistor 120, the other transistor 121 turns ON, to reverse the state of the flip-flop. Thus, the state of flip FF is reversed by the application of a turn-off signal to the base of the then ON transistor. As is conventional, removal of the turn-off signal after changing state does not reverse the flip-flop.

The application of the control signal (turn-off signal) to one or the other or none of the transistors 120 and 121 is controlled by switch contactor 51. In the REV position of contactor 51, the control signal is applied to transistor 121; in the BRK position, to neither transistor; and in the FWD position to transistor 120. When contactor 51 is moved to the FWD position, as shown in FIG. 1B, it engages contact 54, and the signal voltage is applied as a turn-off signal to the base of transistor 120 through a current limiting resistor 136.

If transistor 120 is OFF when the turn-off signal is applied to its base, there is no change; transistor 120 remains OFF. On the other hand if transistor 120 is ON when the turn-off signal is applied to it, transistor 120 is turned OFF to reverse the state of the flip-flop. When transistor 120 is OFF, transistor 121 is ON thereby causing pulse generator 109 to apply firing pulses to the gate of SCR 105 which turns it ON. This energized the motor field winding from line 11 to line 26, through field winding F to line 66, through relay coil 64, to line 65, through SCR 105, to line 25 to the other side of the source at line 10'. Since the SCR 105 only conducts in one direction, it provides for half-wave rectified unidirectional energization of the field winding F, in the illustrated connection it is a field providing for forward rotation of the motor. Due to the high inductance of the field, the rectified half-wave energization produces only a small current in the field winding, which is only a small fraction of normal field current.

In order to overcome this disadvantage, a capacitor 137 is connected across the field winding in series with a current limiting resistor 138. Thus, during energization of the field winding F by the rising voltages of the half-wave rectified A.C., the capacitor 137 is charged; and when the half-wave voltage begins to fall, the charged capacitor 137 supplies current to the field winding and continues to do so during the negative half cycle while the SCR 105 is non-conductive this smooths the half-wave field energization to an undulating continuous unidirectional current which provides for a more rapid build up of the motor field. The resistance 138 inhibits any large peak currents.

When the switch 50 is moved from the FWD to the BRK or stop position, its contactor 51 is open-circuited and removes the signal voltage from the base of transistor 120 of the bistable circuit. This leaves pulse generator 109 ON, so that firing pulses continue on the gate of SCR 105. This leaves the field winding still energized to allow for dynamic braking. If the field were not present there would be no back e.m.f. to drive braking current through the brake resistor R93.

Reverse energization of the field winding F for motor reversal can conveniently be provided by turning switch 50 to its reverse operation position, in which contactor 51 engages contact 58. This places a signal voltage on the base of transistor 121 through a current limiting resistor 150, thereby turning OFF this transistor and transistor 120 ON. This, in turn, impresses a firing signal on the emitter of the pulse generator 108 unijunction 110, which produces an energizing pulse in the transformer 106 secondary, all in the same manner as explained with reference to the transistor 121 and the pulse generator 109 and transformer 107. The pulse passes from the transformer 106 secondary to a pair of series connected resistors 134 and 135 which form a voltage divider connected across the transformer 106 secondary. A tap at the connection of the resistors 134 and 135 is connected to the gate of SCR 104 so that the firing pulse from the pulse generator 108 is impressed thereon and turns ON SCR 104. This provides reverse or negative half-wave rectified A.C. energization to the field winding F for reverse operation of the motor. The capacitor 137 would energize the field winding F until it became fully discharged and then the inductively stored energy in the field would tend to cause current to continue to flow around through SCR 105, thereby holding it turned ON, and the current would continue to circulate as determined by the inductive time constant of the field. This, however, does not occur for the reason that when the half-wave rectified voltage begins to decrease from peak value during each rectified half cycle, and the capacitor 137 starts to supply field current; this capacitor action impresses a reverse bias on SCR 105 and it is turned OFF. Thus, after the capacitor has fully discharged into the field, the field inductance causes current to flow into the discharged capacitor 137, charging it in the opposite sense from its normal charge. This could result in the production of an oscillating circuit with a long decay duration, which would be very objectionable if the motor were to be reversed or restarted.

In order to provide for the safe rapid dissipation of the inductively stored energy of the field after the normal source of energization has been removed, an energy dissipating circuit comprising a bi-directional threshold voltage breakdown device X, such as the circuit illustrated in FIG. 1B, is connected across the field winding F and the capacitor 137 and resistor 138. The energy dissipating circuit X comprises a conventional full-wave rectifier bridge formed by diodes 140, 141, 142, and 143, with input terminals 144 and 145 connected respectively to lines 26 and 65. This places it directly across the field winding F and the capacitor 137 and resistor 138. A Zener diode 146 is connected reverse biased across output terminals 147 and 148 of the voltage full-wave rectifier. Thus, when the normal half-wave rectified field energization is removed from the field winding F and the capacitor 137 becomes fully discharged, the inductively stored energy of the field causes current to flow into the capacitor 137 and charges it until its voltage exceeds the threshold breakdown voltage of the Zener diode 146, thereby causing a breakdown of the Zener diode 146 and limiting the voltage across the field winding. The high current and voltage of the avalanche breakdown provides a rapid dissipation of the inductively stored energy of the field excitation on cessation, for any reason, of supply of rectified half-wave A.C. from the rectifier, such as a deenergization of the field winding prior to reversal thereof, and places the field in condition for reversal. The bi-directional threshold voltage breakdown device X may be replaced by a suitable equivalent for example, a pair of oppositely poled Zener diodes connected in series.

If an operator turns the selector switch 50 from a position for motor operation in one direction to the opposite direction position without allowing time for the motor armature A to come to a complete stop and for the inductively stored energy of the field to be fully dissipated, the motor will not change direction until both of these conditions have been achieved. Protective circuits are provided to effect this regularization of the operation of the system. The capacitor 137 circuit provides one of these protective features in addition to its smoothing of the field winding energization. For example, if the selector switch is reversed too rapidly as stated above, contactor 51 will break its circuit with contact 54 and engage contact 58 too rapidly. This will turn OFF transistor 121 and turn ON transistor 120. These transistors would respectively turn OFF pulse generator 109 and turn ON pulse generator 108, thereby removing the firing pulses from the gate of SCR 105 and applying firing pulses to the gate of SCR 104. These SCR's would not, however, respectively switch OFF and ON in the absence of capacitor 137, because the remaining inductively stored field energy would cause current to continue to flow around SCR 105, holding it ON and reverse bias the cathode-anode path of SCR 104, holding it OFF, for the time constant of the field. As previously explained, with the presence of the capacitor 137 circuit, the charge on capacitor 137 reverse biases SCR 105 as soon as the half-wave voltage from SCR 105 starts to fall from its peak value, thereby turning OFF SCR 105. Thus, when the firing pulses from pulse generator 109 cease, SCR 105 ceases being turned ON. The field energy is dissipated by the threshold breakdown voltage device 146 as has been explained, but SCR 104 is not switched on during this energy dissipation process. As long as the field is dissipating its stored energy, the SCR 104 cathode-anode path is reverse biased so that it does not turn ON until the voltage of the field falls so as to remove this reverse bias. While this assures dissipation of field inductively stored energy before field energization is reversed, there remains the problem of full stoppage of the motor.

If the motor were running at high speed with a large inertial load and the field were reversed, the back emf of the armature would be reversed, causing a dangerously large current through diode D3 of the main-full wave rectifier. This is prevented, even if the switch 50 be turned to its reverse position before the motor has stopped, as the field will not be reversed and power will not be reapplied to the armature until the motor stops because:

1. A circuit comprising a switching device 155, such as a transistor, is connected between the line 122 connection to switch contactor 51 and the grounded positive bus B+ through the diode 91 in the regenerative breaking circuit. The base of transistor 155 is connected to positive bus B+ through a resistor 156, so that as long as a braking current flows through diode 91; that is, as long as the armature has not stopped, the forward voltage drop across diode 91 turns ON the transistor 155, thereby removing the signal voltage from switch contactor 51. This prevents reversal of field winding F as long as the armature A is not at standstill. The diode 157 connected in line 122 ahead of switch contactor 51 assures against the application of a positive voltage to the base of either transistor 120 or 121 of the bistable pulse generator control circuit. The resistor 158 in line 122 is a current-limiting resistor.

2. As previously explained the voltage drop across the regenerative braking line diode 91 during the flow of braking current therethrough turns ON transistor Q6 which prevents turning ON the main rectifier SCR's 16 and 17, thus holding off power to the armature until there is no braking current, which occurs when the motor has stopped.

In starting the motor, the filed winding will be energized causing current to energize relay coil 64. The relay does not have an instant closing action, so that there is a delay in its closure of the circuit through relay contacts 67, thus providing a delay in turning OFF the transistor Q5 and causing a consequent delay in the switching ON of the main rectifier SCR's 16 and 17. This delays energization of the armature and allows the field to build up before the armature current is switched ON. This prevents a large initial armature current surge. A thyristor 160 is connected across power supply lines 10'-11' with a capacitor 161 shunt connected thereacross in series with a current-limiting resistor 162 to provide protection to the system against very fast spikes.

While a particular embodiment of this invention has been described, modifications thereof will occur to those skilled in the art. It is to be understood, therefore, that the invention is not to be limited to the specific example disclosed.

What we claim is:

1. In a control system for a shunt D.C. motor having a field excitation winding, a reversible excitation system for said field winding comprising:
   A. capacitance means connected in parallel with said winding;
   B. means including A.C. rectifying means for selectively supplying positive half-wave rectified A.C. and negative half-wave rectified A.C. to said parallel connected field winding and capacitance means for selectively reversibly exciting said motor for reversible operation thereof; and
   C. bi-directional threshold voltage breakdown means connected across said field winding and capacitance means for dissipating inductively stored energy of the field winding after removal of the half-wave rectified A.C. energization from the field winding, said threshold voltage breakdown means having a breakdown voltage threshold above the normal applied half-wave rectified A.C. from said rectifying means.

2. A field excitation system as defined in claim 1 wherein said be-directional threshold voltage breakdown means comprises a full wave rectifier bridge having input terminals connected across said field exciting winding, and a threshold voltage breakdown device connected reverse-biased across the output terminals of the bridge.

3. The combination as in claim 1 wherein there is means for preventing reversal of the energization applied to said field winding when changing from one motor rotation direction to the opposite direction until the motor has stopped.

4. The combination as in claim 3 wherein there is a dynamic braking circuit and means for rendering it operative with said motor, and wherein said means for preventing the reversal of field energization is responsive to a condition of said dynamic braking circuit.

* * * * *